US007639291B2

(12) United States Patent
Lim et al.

(10) Patent No.: US 7,639,291 B2
(45) Date of Patent: Dec. 29, 2009

(54) DARK CURRENT/CHANNEL DIFFERENCE COMPENSATED IMAGE SENSOR

(75) Inventors: Yan Ping Lim, Albany, OR (US); Ray Alan Mentzer, Corvallis, OR (US)

(73) Assignee: Aptina Imaging Corporation, Grand Cayman (KY)

( * ) Notice: Subject to any disclaimer, the term of this patent is extended or adjusted under 35 U.S.C. 154(b) by 642 days.

(21) Appl. No.: 11/140,650

(22) Filed: May 27, 2005

(65) Prior Publication Data

US 2006/0268135 A1 Nov. 30, 2006

(51) Int. Cl.
*H04N 9/64* (2006.01)
(52) U.S. Cl. .................................................... 348/243
(58) Field of Classification Search ................. 348/243, 348/241, 222.1, 207.99, 261
See application file for complete search history.

(56) References Cited

U.S. PATENT DOCUMENTS 7,161,626 B1 * 1/2007 Nara .......................... 348/243
2001/0028392 A1 * 10/2001 Yamamoto et al. .......... 348/207
2004/0090547 A1 * 5/2004 Takeda ....................... 348/241

* cited by examiner

*Primary Examiner*—Nhan T Tran
*Assistant Examiner*—Akshay Trehan
(74) *Attorney, Agent, or Firm*—RatnerPrestia

(57) ABSTRACT

A method for compensating for dark current in an image sensor array. In a representative embodiments, the method includes determining a nominal average dark current for the image sensor array, determining location of each pixel in the image sensor array, obtaining a nominal dark current associated with each pixel based on the nominal average dark current and on the location of the pixel, and subtracting the associated nominal dark current from the image signal for each pixel. At least two of the pixels have differing associated nominal dark currents. In other representative embodiments compensation values for dark currents and for differences in channel processing are determined during the same time period.

16 Claims, 10 Drawing Sheets

DARK CURRENT/CHANNEL DIFFERENCE COMPENSATED IMAGE SENSOR

BACKGROUND

The use of solid state imaging devices such as CMOS and other image sensor arrays are found in a growing number of electronic products including digital cameras and some cell phones. In digital cameras in particular, there has been a push to capture images with seemingly greater and greater resolution which has necessitated the development of image sensor chips having increased numbers of pixels.

Each pixel in an image sensor array converts the light incident on that pixel into electronic charge which is accumulated for a fixed period of time. The accumulated charge is then transferred out of the array in a preselected order and typically detected as a voltage signal.

The leakage current in the pixel is often referred to as the dark current of the device, i.e., the current through the light sensitive element in the absence of any light. The lowest light intensity that is detectable by this photosensitive device is dictated by the noise in the device and the dark current. Thus, it is important to keep such leakage currents as small as possible.

For economic reasons in the fabrication of integrated circuits, it is important to keep the size of the integrated circuit die small. As such, increasing the number of pixels in an image sensor array results in an effort to reduce the size of individual pixels, so as to keep the overall die size small. The smaller the size of a given pixel, the less charge that will be photogenerated in a fixed time period. The smaller signal thus created is not accompanied by a proportional decrease in the dark current with a resultant decrease in the signal-to-noise ratio.

In addition, signals from different pixels of an image sensor may pass through different processing channels. For example, a typical color image sensor will have three channels corresponding to the red, green, and blue colors. These processing channels will have differing design gains due to differing sensitivities of the various pixels to differing color bands. In addition to the design difference, however, the different processing channels will also have variations due to processing variations, operating temperatures, and the like.

SUMMARY

In representative embodiments, methods for compensating for dark current in an image sensor array is disclosed. The method comprises determining a nominal average dark current for the image sensor array, determining location of each pixel in the image sensor array, obtaining a nominal dark current associated with each pixel based on the nominal average dark current and on the location of the pixel, and subtracting the associated nominal dark current from the image signal for each pixel. At least two of the pixels have differing associated nominal dark currents.

In other representative embodiments, methods for image signal compensation in an image sensor are disclosed. The image sensor comprises an image sensor array having multiple light sensitive pixels and more than one signal detection/processing channels. The method steps comprise, for a preselected period of time, attaching the input of each channel to ground potential and receiving a difference output signal at the output of each channel. The image sensor array comprises a first sub-array of pixels and a second sub-array of pixels. The pixels in the first sub-array are blocked from receiving light illumination, and the pixels in the second sub-array are capable of capturing an image.

For an additional pre-selected period of time, the method steps comprise receiving a dark current signal from the first sub-array at input of each channel and transforming the dark current signal into a dark current compensation output signal for each of the channels.

The above method steps are repeated at least once. For each channel other than a pre-selected reference channel, the method steps further comprise computing a channel compensation value using the difference output signal for that channel and the difference output signal for the reference channel, storing the computed channel compensation values, computing a dark current compensation value for each channel using the dark current compensation output signal for that channel, and storing the computed dark current compensation values.

And in still other representative embodiments, an image sensor circuit is disclosed. The image sensor circuit comprises an image sensor array, a dark current compensation circuit having an input connected to a second sub-array, a signal processing circuit, a first switch, and a second switch. The image sensor array comprises a first sub-array of pixels and the second sub-array of pixels; pixels in the first sub-array are blocked from receiving light illumination; and pixels in the second sub-array are capable of capturing an image. The first switch has capability of switching input to the signal processing circuit between the output of the first sub-array during a first time period and the output of the dark current compensation circuit during a second time period. The second switch has capabilities of switching output of the signal processing circuit between input to the dark current compensation circuit during the first time period and output of the image sensor circuit during a second time period. The dark current compensation circuit has capabilities of determining a nominal average dark current for the image sensor array from the output signal of the signal processing circuit during the first time period, determining the location of each pixel in the second sub-array, obtaining an associated nominal dark current for with each pixel in the second sub-array based on the nominal average dark current and on the location of the pixel, and subtracting the associated nominal dark current from the image signal for each pixel during the second time period. At least two of the pixels have differing associated nominal dark currents.

Other aspects and advantages of the representative embodiments presented herein will become apparent from the following detailed description, taken in conjunction with the accompanying drawings.

BRIEF DESCRIPTION OF THE DRAWINGS

The accompanying drawings provide visual representations which will be used to more fully describe various representative embodiments and can be used by those skilled in the art to better understand them and their inherent advantages. In these drawings, like reference numerals identify corresponding elements.

DETAILED DESCRIPTION

Figure 1A:
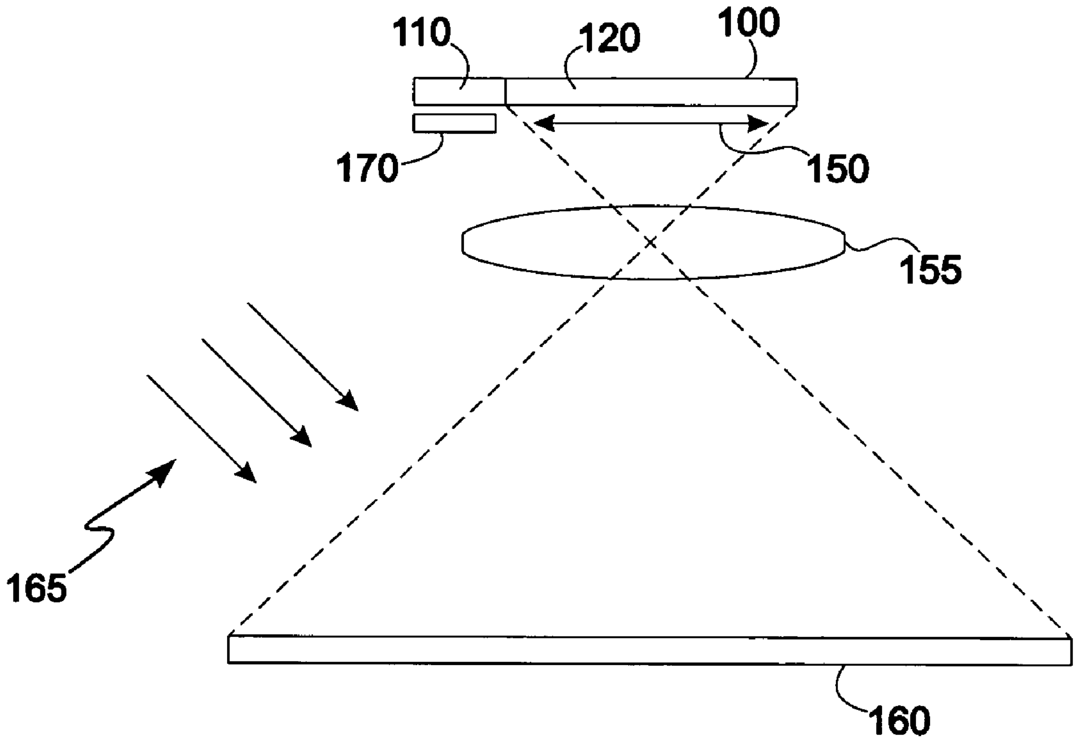
FIG. 1A is a drawing of an image sensor array as described in various representative embodiments.

As shown in the drawings for purposes of illustration, the present patent document discloses novel techniques for compensating for dark current in an image sensor array and for compensating for channel differences in a multi-channel image sensor. Previous image sensors have not been capable of correcting for these variations as accurately and as quickly as can the present techniques.

In the following detailed description and in the several figures of the drawings, like elements are identified with like reference numerals.

FIG. 1A is a drawing of an image sensor array 100 as described in various representative embodiments. As shown in FIG. 1A, the image sensor array 100 comprises a first sub-array 110 and a second sub-array 120. Both the first sub-array 110 and the second sub-array 120 comprise light sensitive pixels 130 which are indicated on FIG. 1B as discussed in the following. In FIG. 1A, an image 150 of an object 160 illuminated by light 165 is focused by a lens 155 onto and captured by the image sensor array 100 via pixels 130 in the second sub-array 120 of the image sensor array 100. Light is blocked by a light barrier 170, also referred to herein as a light shield 170, placed over the first sub-array 110 such that pixels 130 in the first sub-array 110 do not experience photo-excitation. As such, any signals produced by the first sub-array 110 are due to leakage currents which are commonly referred to as dark currents.

Figure 1B:
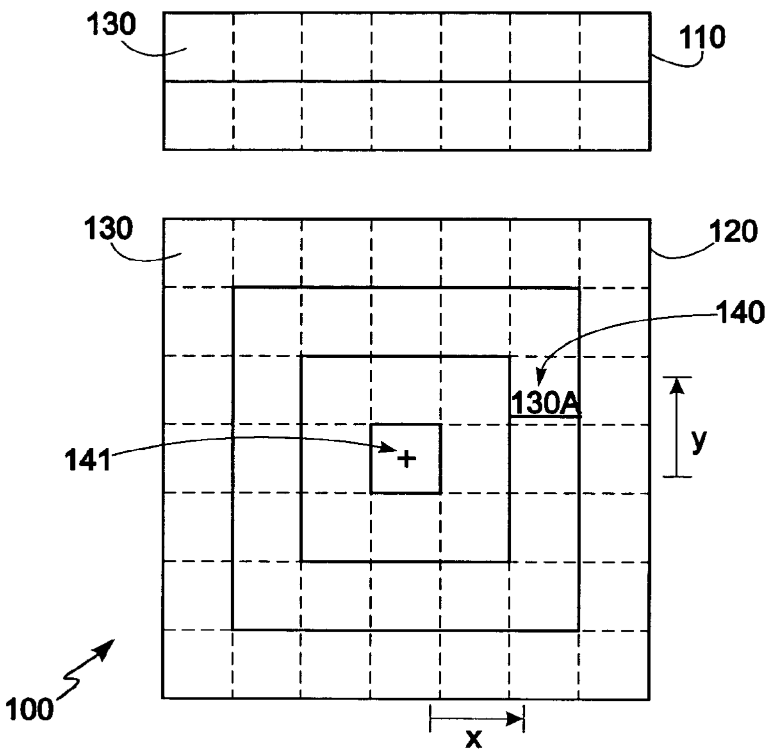
FIG. 1B is another drawing of the image sensor array as described in various representative embodiments.

FIG. 1B is another drawing of the image sensor array 100 as described in various representative embodiments. Shown in FIG. 1B, as was shown in FIG. 1A, the image sensor array 100 comprises the first sub-array 110 and the second sub-array 120. And as stated above, both the first sub-array 110 and the second sub-array 120 comprise light sensitive pixels 130. For clarity of illustration, only one pixel 130 is shown with an identifying number in FIG. 1B in each of the sub-arrays 110,120. There is also one additional pixel 130*a* indicated in the second sub-array 120. Each of the pixels 130 can be assigned a location 140 in the image sensor array 100 and in particular in the second sub-array 120 which is indicated in FIG. 1B for only the one pixel 130*a*. This location 140 can be specified, for example, by an X and a Y coordinate as measured from center 141 of the second sub-array 120 or other convenient reference point.

Figure 1C:
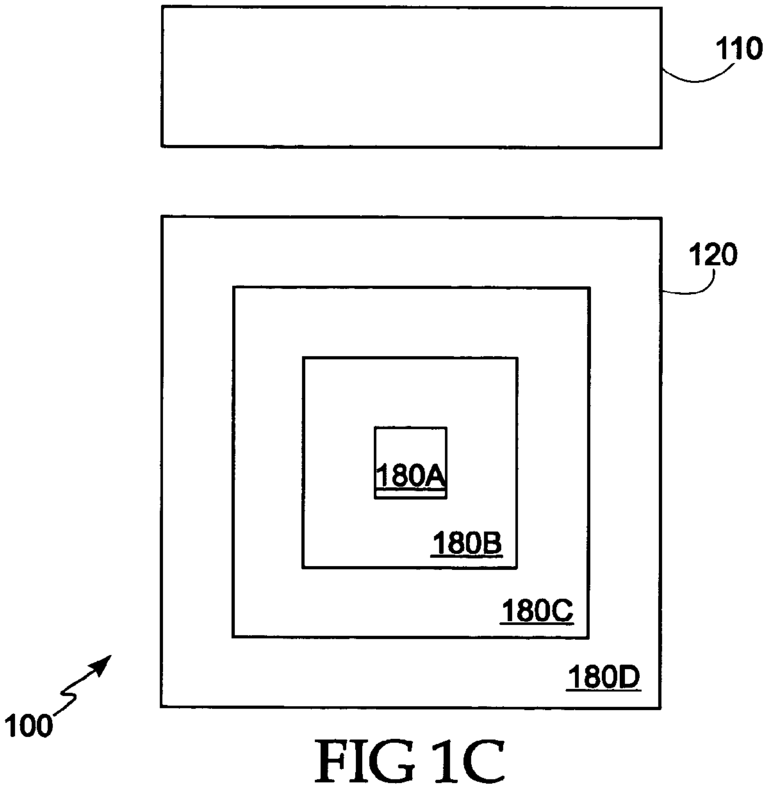
FIG. 1C is still another drawing of the image sensor array as described in various representative embodiments.

FIG. 1C is still another drawing of the image sensor array 100 as described in various representative embodiments. In FIG. 1C, pixels 130 in the second sub-array 120 of the image sensor array 100 are grouped together into related groups, bands, or blocks 180 indicated in FIG. 1C as bands 180 and shown specifically as the bands 180*a*,180*b*,180*c*,180*d*. Other convenient bands or groups of pixels 130, as for example circular bands 180, are also possible.

Image sensor arrays 100 integrate the leakage or dark current at each pixel 130 in addition to the photocurrent created due to image 150 illumination of their pixels 130. It is usually desirable to compensate for this dark current and is often done so by subtracting a value from the signal for each pixel 130 that is proportional to the mean dark signal. The signal due to the dark current which is commonly referred to as the dark signal can be measured from, for example, the first sub-array 110 which could be a row or two of pixels 130 along one of the edges of the imaging array, i.e., the second sub-array 120. The image signal from each of the pixels 130 of the second sub-array 120 can then be compensated by subtraction of a common value which could be, for example, the average of the dark signal from the pixels 130 in the first sub-array 110. However, in certain image sensor arrays 100 dark current is known to increase radially from the center of the imaging array due to hydrogen depletion by the titanium under large power and ground busses surrounding the image sensor array 100 and have its largest value at the edge of the image sensitive area, i.e., the second sub-array 120. Hydrogen is known to fill empty positions in the crystal lattice and thereby reduce dark currents.

Obtaining a single value as above and subtracting it from all pixels 130 in the second sub-array 120 will subtract a value too large from the image signal at the center of the second sub-array 120 and a value too small at the edge of the second sub-array 120. The result can be images 150 having reduced clarity in low-light level conditions and generally having shifts in color responsiveness of the second sub-array 120 dependent upon pixel location 140.

Another technique that could be used for dark current compensation is to cover the full extent of the second sub-array 120 and capture the signal resultant from each pixel 130. Then pixel 130 by pixel 130 the dark signal from each pixel 130 is subtracted from the image 150 signal. However, this an expensive solution as a frame buffer as large as the second sub-array 120 would be required which would consume a large area within the chip and would also negatively impact the exposure frame rate as the frame buffer would need to be updated every time the gain, exposure time, and temperature or the like changed.

In representative embodiments, a value for the dark signal is obtained, for example, by obtaining an average of the dark current signal from the first sub-array 110. That average value is then applied via an algorithm related to the location 140 of any given pixel 130 or group of pixels 130 on the second sub-array 120 to obtain a value for use in compensating the dark current for that pixel 130 or group of pixels 130. For example, the compensation value for a given pixel 130 could be proportional to the average value of the dark current measured from the first sub-array 110 and also proportional to the distance the pixel 130 is located from the center of the second sub-array 120.

In other representative embodiments, the second sub-array 120 could be conceptually divided into several blocks 180 or bands 180 of pixels 130 with the location 140 factor based upon some location dependent parameter of each band, which could be the average distance of the band 180 from the center of the second sub-array 120, for example. In addition to the bands 180 shown in FIG. 1C (also indicated by the dark outlines in FIG. 1B), other configurations are possible, for example circular bands 180, elliptical bands 180 and others, as well as other non-closed geometries.

A dark current compensation function, such as described above, could be built into an existing algorithm in a digital camera, as for example the typically already existent anti-vignetting algorithm often found in digital cameras. Calibration of the dark current compensation could be performed at wafer test, following packaging of the image sensor array 100, periodically by the user, or at any other convenient time with the appropriate parameters and/or algorithm built into associated circuitry for storing compensation and distance values as appropriate.

Figure 2:
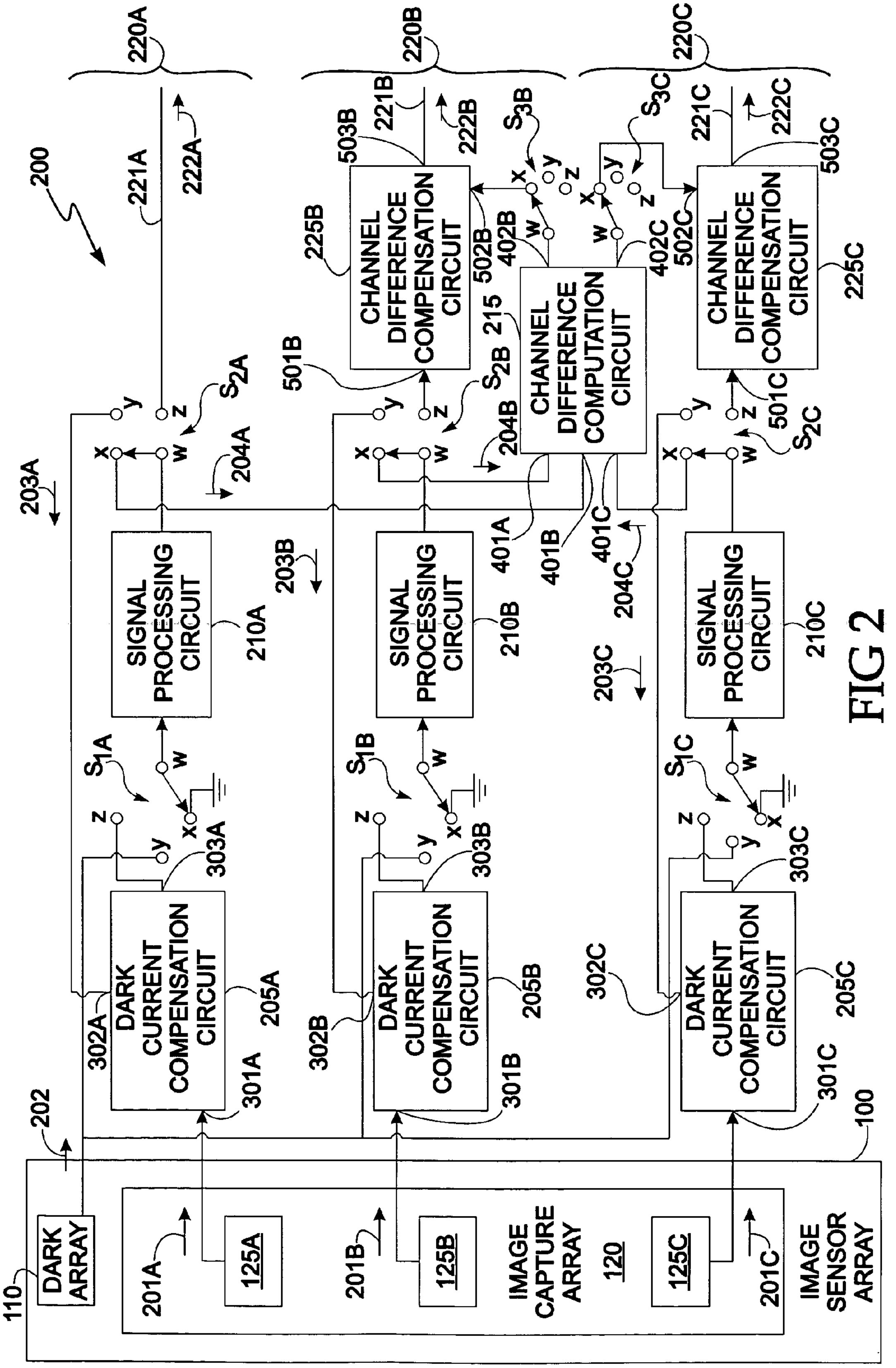
FIG. 2 is a drawing of a block diagram of an image sensor circuit as described in various representative embodiments.

FIG. 2 is a drawing of a block diagram of an image sensor circuit 200 as described in various representative embodiments. The image sensor circuit 200 is also referred to herein as the image sensor 200. In FIG. 2, the image sensor array 100 comprises the first sub-array 110, also referred to herein as the dark array 110, and the second sub-array 120, also referred to herein as the image capture array 120. In representative embodiments, the image 150 is captured by the image capture array 120. The image signal 201 from the image capture array 120 is collected from three separate groups of pixels 130 which are first, second, and third channel sub-arrays 125A, 125B,125C and which could detect, for example, three colors such as red, green, and blue in the image 150 and which undergo separate signal processing in first, second, and third channels 220A,220B,220C, also referred to herein as first, second, and third signal detection/processing channels 220A, 220B,220C. The image signal 201 from the image capture array 120 is shown in FIG. 2 as first, second, and third channel image signals 201A,201B,201C which are separately received from first, second, and third channel sub-arrays 125A,125B,125C and which are separately fed into inputs of a first, a second, and a third dark current compensation circuits 205A,205B,205C.

The choice of three channels in FIG. 2 is for clarity of illustration. It will be recognized by one of ordinary skill in the art that other choices for the number of channels are also possible. In particular, four channels are often found in modern image sensors wherein the channels are often designated as red, green0, blue, and green1. Circuitry and techniques for four and other numbers of channels are similar, but with appropriate changes, to that described with respect to FIG. 2.

The image sensor circuit 200 of FIG. 2 comprises three modes of operation as follows: (1) a channel difference calibration mode x-w, (2) a dark current calibration mode y-w, and (3) a compensated operational mode z-w. The mode of the image sensor circuit 200 is determined by the positions of a first first-channel switch $S_{1A}$, a first second-channel switch $S_{1B}$, a first third-channel switch $S_{1C}$, a second first-channel switch $S_{2A}$, a second second-channel switch $S_{2B}$, and a second third-channel switch $S_{2C}$, a third second-channel switch $S_{3B}$, and a third third-channel switch $S_{3C}$. The first first-channel switch $S_{1A}$, first second-channel switch $S_{1B}$, first third-channel switch $S_{1C}$, second first-channel switch $S_{2A}$, second second-channel switch $S_{2B}$, second third-channel switch $S_{2C}$, third second-channel switch $S_{3B}$, and third third-channel switch $S_{3C}$ act in synchronization.

When first first-channel, first second-channel, and first third-channel switches $S_{1A}$,$S_{1B}$,$S_{1C}$, when second second-channel, and second third-channel switches $S_{2A}$,$S_{2B}$,$S_{2C}$, and when third second-channel, and third third-channel switches $S_{3B}$,$S_{3C}$ are in the positions shown in FIG. 2, the image sensor circuit 200 is in the channel difference calibration mode x-w. In the channel difference calibration mode x-w, the center contact w of each switch is electrically connected to a first switch contact x of that switch; in the dark current calibration mode y-w, the center contact w of each switch is electrically connected to a second switch contact y of that switch; and in the compensated operational mode z-w, the center contact w of each switch is electrically connected to a third switch contact z of that switch.

In channel difference calibration mode x-w, appropriate measurements are performed to determine the necessary compensation for channel differences. In dark current calibration mode y-w, appropriate measurements are performed to determine the necessary compensation for dark current. And, in compensated operational mode z-w, an image 150 is captured by the image capture array 120 and the image signal is appropriately compensated for dark current, as well as for channel difference. In representative embodiments, measurements to determine the necessary compensation for channel differences are interleaved with measurements to determine the necessary compensation for dark current. Such interleaving is performed by alternating between channel difference calibration mode x-w and dark current calibration mode y-w after every pixel, every two pixels, or every few pixels. The read out order could be, for example, dark current green0, dark current red, channel difference green0, channel difference red for a green0-red row. And, the read out order could be, for example, dark current blue, dark current green1, channel difference blue, and channel difference green1.

In calibrating the image sensor circuit 200 for channel differences (the image sensor circuit 100 in channel difference calibration mode x-w with each first switch contact x connected to its associated center contact w shown in FIG. 2) inputs to a first, a second, and a third signal processing circuits 210A,210B,210C are attached to ground potential via respectively the first first-channel, first second-channel, and first third-channel switches $S_{1A}$,$S_{1B}$,$S_{1C}$. First, second, and third signal processing circuits 210A,210B,210C process the zero potential input with the first, second, and third signal processing circuits 210A,210B,210C with typically each comprising an amplification circuit and an analog to digital circuit. First, second, and third difference output signals 204A,204B,204C which are the outputs of the first, second, and third signal processing circuits 210A,210B,210C are connected to the inputs of the channel difference computation circuit 215. Further, when as above the second first-channel, second second-channel, and second third-channel switches $S_{2A}$,$S_{2B}$,$S_{2C}$ are in the positions shown in FIG. 2, the outputs of the channel difference computation difference modification circuit 215 are connected to a first and a second channel difference compensation circuits 225B,225C via respectively third second-channel and third third-channel switches $S_{3B}$,$S_{3C}$.

Note that the positions of the first first-channel, first second-channel, and first third-channel switches $S_{1A}$,$S_{1B}$,$S_{1C}$, the positions of the second first-channel, second second-channel, and second third-channel switches $S_{2A}$,$S_{2B}$,$S_{2C}$, and the positions of the third second-channel and second third-channel switches $S_{3B}$,$S_{3C}$ are such that (1) when the first first-channel switch $S_{1A}$ connects the input of the first signal processing circuit 210A to ground potential that the second first-channel switch $S_{2A}$ connects the output of the first signal processing circuit 210A to the input to the channel difference computation circuit 215; (2) when the first second-channel switch $S_{1B}$ connects the input of the second signal processing circuit 210B to ground potential that the second second-channel switch $S_{2B}$ connects the output of the second signal processing circuit 210B to the input to the channel difference computation circuit 215 and the third second-channel switch $S_{3B}$ connects one of the outputs of the channel difference computation circuit 215 to one of the inputs of second channel difference compensation circuit 225B; and (3) when the first third-channel switch $S_{1C}$ connects the input of the third signal processing circuit 210C to ground potential that the second third-channel switch $S_{2C}$ connects the output of the third signal processing circuit 210C to the input to the channel difference computation circuit 215 and the third third-channel switch $S_{3C}$ connects one of the outputs of the channel difference computation circuit 215 to one of the inputs of third channel difference compensation circuit 225C.

When as above the first first-channel, first second-channel, and first third-channel switches $S_{1A}$,$S_{1B}$,$S_{1C}$ are in the positions shown in FIG. 2, the outputs of the first, second, and third signal processing circuits 210A,210B,210C are connected to the channel difference computation circuit 215 as just stated. In that mode, the channel difference computation circuit 215 compares the signal outputted by the second and third signal processing circuits 210B,210C with that of the signal outputted by the first signal processing circuit 210A. The results of these comparisons are outputted to the second and third channel difference compensation circuits 225B, 225C via third second-channel, and third third-channel switches $S_{3B}$,$S_{3C}$. The inputs to and the outputs from the second and third channel difference compensation circuits 225B,225C are typically digital. The above comparison will take place during the channel difference calibration mode x-w which is interleaved with obtaining dark current compensation values during the dark current calibration mode y-w.

During the compensated operational mode z-w (each third switch contact z connected to its associated center contact w) second and third channel difference compensation circuits 225B,225C use these comparisons to appropriately modify image signals respectively outputted by the second and third signal processing circuits 210B,210C compensating them for differences in the signal paths of the channels 220A,220B, 220C; second channel difference compensation circuit 225B outputs its appropriately modified input signal to a second channel output 221B as second channel output signal 222B; third channel difference compensation circuit 225C outputs its appropriately modified input signal to a third channel output 221C as third channel output signal 222C; and the output of the first signal processing circuit 210A is outputted directly to a first channel output 221A as first channel output signal 222A.

In calibrating the image sensor circuit 200 for dark current, the image sensor circuit 200 is placed in dark current calibration mode y-w wherein each second switch contact y is connected to its associated center contact w. In this mode, a dark current signal 202 from the dark array 110 is fed into the inputs to a first, a second, and a third signal processing circuits 210A,210B,210C via respectively the first first-channel, first second-channel, and first third-channel switches $S_{1A}$,$S_{1B}$, $S_{1C}$. First, second, and third signal processing circuits 210A, 210B,210C process the dark current signal 202 with the first, second, and third signal processing circuits 210A,210B,210C with typically each comprising an amplification circuit and an analog to digital circuit. First, second, and third dark current compensation output signals 203A,203B,203C which are typically digital signals are fed back to the first, second, and third dark current compensation circuits 205A,205B,205C via the second first-channel, second second-channel, and second third-channel switches $S_{2A}$,$S_{2B}$,$S_{2C}$. Dark current compensation values are obtained by the first, second, and third dark current compensation circuits 205A,205B,205C. The obtained dark current compensation values are then separately subtracted from the first, second, and third image signals 201A,201B,201C by the first, second, and third dark current compensation circuits 205A,205B,205C.

Note that the positions of the first first-channel, first second-channel, and first third-channel switches $S_{1A}$,$S_{1B}$,$S_{1C}$ and the positions of the second first-channel, second second-channel, and second third-channel switches $S_{2A}$,$S_{2B}$,$S_{2C}$, are such that (1) when the first first-channel switch $S_{1A}$ connects the output of the dark array 110 to the input of the first signal processing circuit 210A that the second first-channel switch $S_{2A}$ connects the output of the first signal processing circuit 210A to one of the inputs of the first dark current compensation circuit 205A; (2) when the first second-channel switch $S_{1B}$ connects the output of the dark array 110 to the input of the second signal processing circuit 210B that the second second-channel switch $S_{2B}$ connects the output of the second signal processing circuit 210B to one of the inputs of the second dark current compensation circuit 205B and the third second-channel switch $S_{3B}$ is open circuited; and (3) when the first third-channel switch $S_{1C}$ connects the output of the dark array 110 to the input of the third signal processing circuit 210C that the second third-channel switch $S_{2C}$ connects the output of the third signal processing circuit 210C to one of the inputs of the third dark current compensation circuit 205C and the third third-channel switch $S_{3C}$ is open circuited.

During the compensated operational mode z-w (each third switch contact z connected to its associated center contact w), (1) the first first-channel switch $S_{1A}$ connects the output of the first dark current compensation circuit 205A to the input of the first signal processing circuit 210A and the second first-channel switch $S_{2A}$ connects the output of the first signal processing circuit 210A to a first channel output 221A; (2) the first second-channel switch $S_{1B}$ connects the output of the second dark current compensation circuit 205B to the input of the second signal processing circuit 210B, the second second-channel switch $S_{2B}$ connects the output of the second signal processing circuit 210B to a second channel difference compensation circuit 225B, and the third second-channel switch $S_{3B}$ connects one of the outputs of the channel difference computation circuit 215 to an open circuit position; and (3) the first third-channel switch $S_{1C}$ connects the output of the third dark current compensation circuit 205C to the input of the third signal processing circuit 210C, the second third-channel switch $S_{2C}$ connects the output of the third signal processing circuit 210C to a third channel difference compensation circuit 225C, and the third third-channel switch $S_{3C}$ connects one of the outputs of the channel difference computation circuit 215 to an open circuit position.

Figure 3:
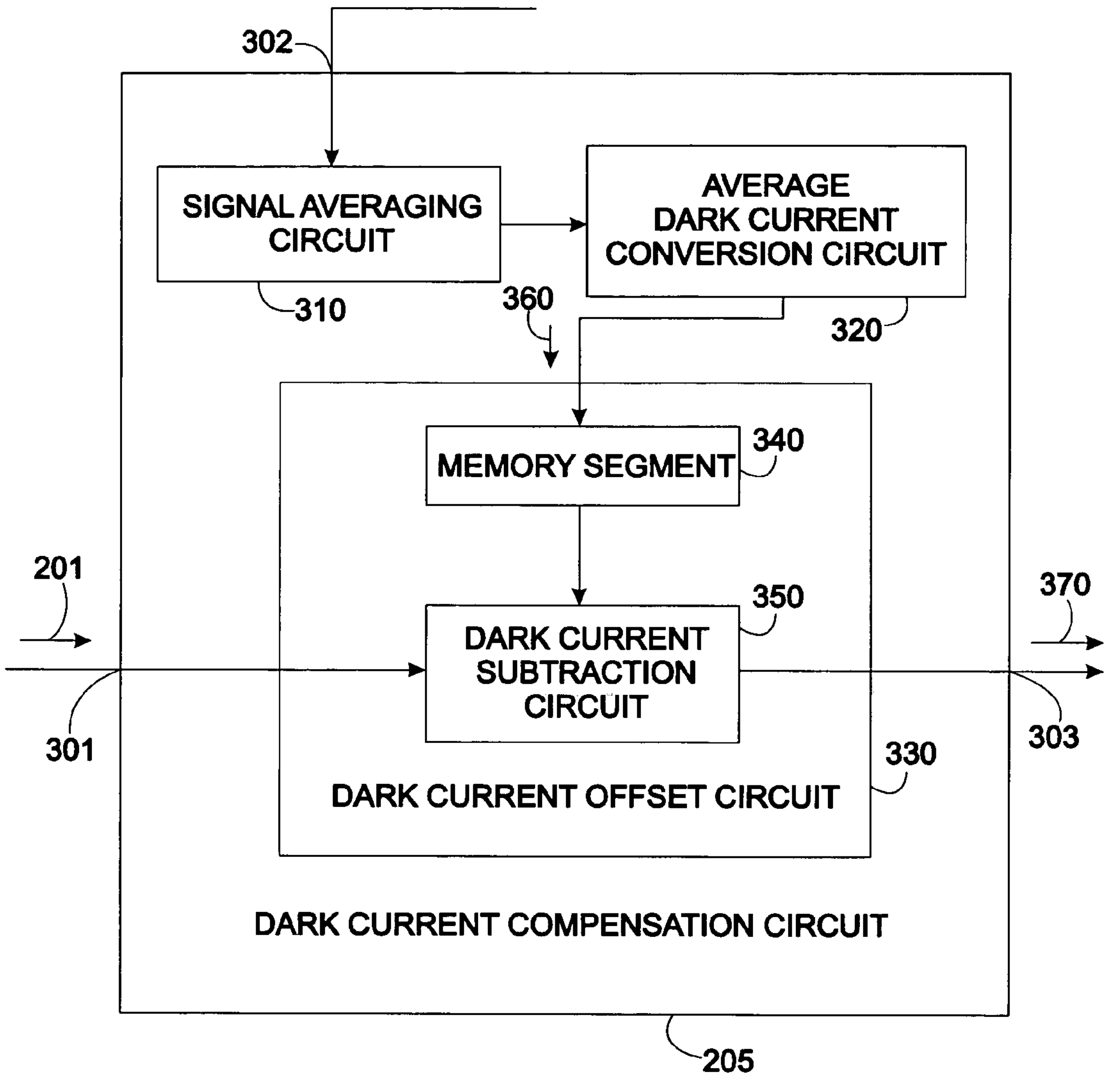
FIG. 3 is a drawing of a block diagram of one of the dark current compensation circuit as described in various representative embodiments.

FIG. 3 is a drawing of a block diagram of one of the dark current compensation circuits 205 as described in various representative embodiments. In describing individual components representative of channel components, identifying numerals will be written without the trailing letter. For example, the representative dark current compensation circuit will use the identifying numeral 205 rather than identifying numerals 205A, 205B, and/or 205C. The dark current compensation circuit 205 receives one of the channel image signals 201 from the image capture array 120 at dark current compensation circuit first input 301, input from the output of one of the signal processing circuits 210 at dark current compensation circuit second input 302, and provides output to one of the first switches $S_1$ at dark current compensation circuit output 303. The dark current compensation circuit 205 comprises a signal averaging circuit 310, an average dark current conversion circuit 320, and a dark current offset circuit 330. The dark current offset circuit 330 comprises a dark current memory segment 340 and a dark current subtraction circuit 350.

In operation, during the time period that each of the dark arrays 110 are connected to the signal processing circuits 210, output of the signal processing circuits 210 are connected to dark current compensation circuit second inputs 302. The signal averaging circuit 310 performs an average of the signal received from the signal processing circuit 210. That average is then converted by the average dark current conversion circuit 320 into a dark current compensation value 360 which is an analog value of the appropriate magnitude for compensating for the dark current component of the channel image signal 201 received from the image capture array 120. The dark current compensation value 360 is stored in the dark current memory segment 340 and is subtracted by the dark current subtraction circuit 350 from the channel image signal 201 received at dark current compensation circuit first input 301. The result of that subtraction is outputted as dark current compensated image signal 370 at dark current compensation circuit output 303.

As will be known to one of ordinary skill in the art, the signal averaging performed by the signal averaging circuit 310 could be performed on the dark current compensation output signal 203 received from the signal processing circuit 210 in either as received in digital format or after conversion to analog format. As such, the average dark current conversion circuit 320 could receive its input directly from the signal processing circuit 210 and provide its output to the signal averaging circuit 310 instead of as shown in FIG. 3. Further, the dark current compensation performed by the dark current compensation circuit 205 could be performed after the output of the signal processing circuit 210 in the digital domain instead of before the input to the signal processing circuit 210. The choice is one made by the designer. The advantage of performing the dark current compensation prior to the input to the signal processing circuit 210 is that a larger dynamic range is available for the image part of the channel image signals 210 under low light conditions wherein the dark current forms a relatively larger part of the channel image signal 210.

Figure 4:
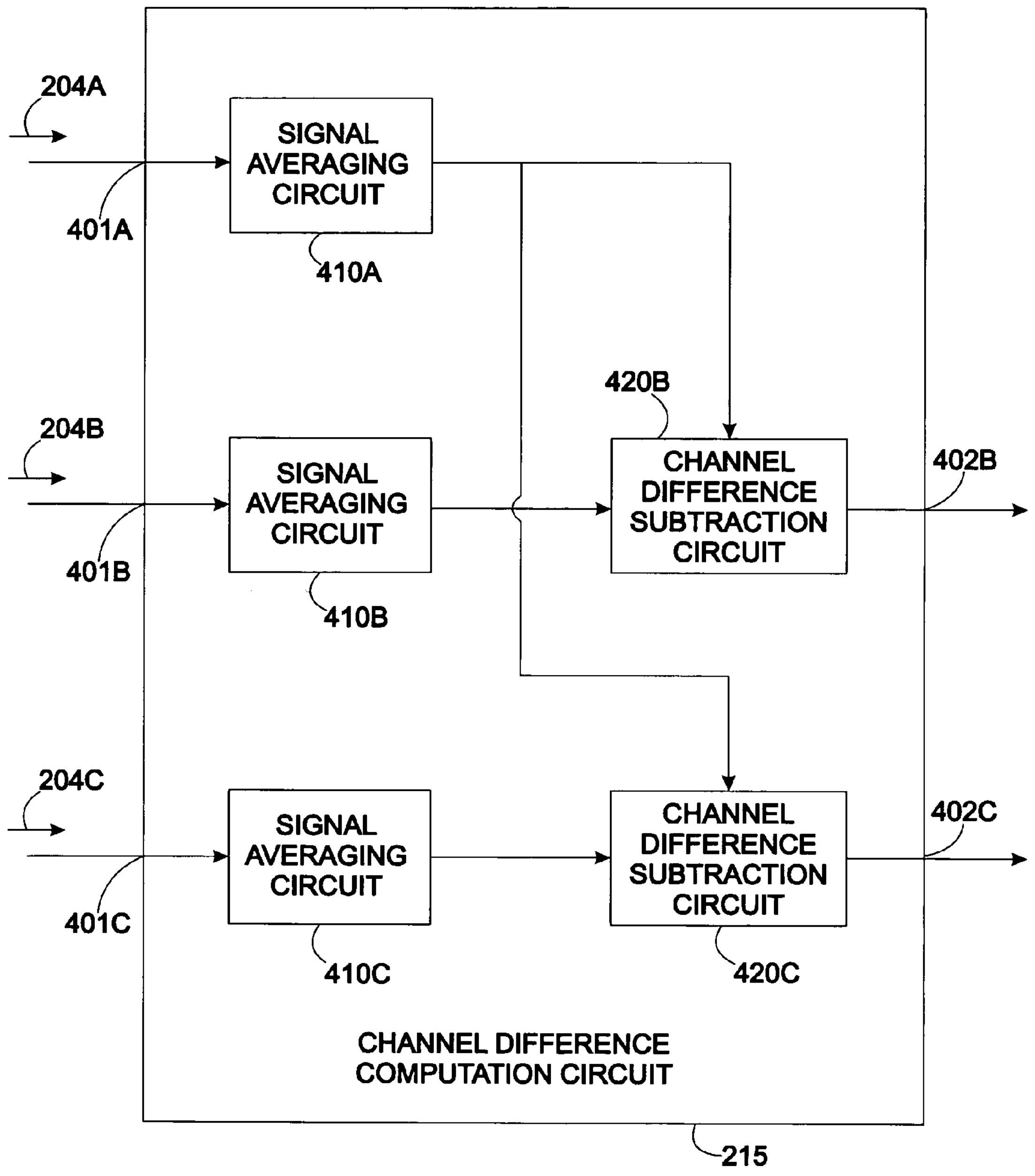
FIG. 4 is a drawing of a block diagram of the channel difference computation circuit as described in various representative embodiments.

FIG. 4 is a drawing of a block diagram of the channel difference computation circuit 215 as described in various representative embodiments. The channel difference computation circuit 215 comprises a first, a second, and a third signal averaging circuits 410A,410B,410C. The channel difference computation circuit 215 further comprises a second and a third channel difference subtraction circuits 420B,420C.

In channel difference calibration mode x-w, the channel difference computation circuit 215 receives first, second, and third difference output signals 204A,204B,204C at respectively channel difference computation circuit first, second, and third inputs 401A,401B,401C of the difference computation circuit 215 from outputs of respectively first, second, and third signal processing circuits 210A,210B,210C via second first-channel, second second-channel, and second third-channel switches $S_{2A}$,$S_{2B}$,$S_{2C}$. The first, second, and third signal averaging circuits 410A,410B,410C obtain an average respectively of first, second, and third difference output signals 204A,204B,204C.

Average values from first and second signal averaging circuits 410A,410B are inputted to second channel difference subtraction circuit 420B, and average values from first and third signal averaging circuits 410A,410C are inputted to third channel difference subtraction circuit 420C. Second channel difference subtraction circuit 420B subtracts the output of the second signal averaging circuit 410B from the output of the first signal averaging circuit 410A and outputs that value at channel difference computation circuit first output 402B. Third channel difference subtraction circuit 420C subtracts the output of the third signal averaging circuit 410C from the output of the first signal averaging circuit 410A and outputs that value at channel difference computation circuit second output 402C.

In compensated operational mode, the channel difference computation circuit first, second, and third inputs 401A, 401B,401C are disconnected from respectively outputs of the first, second, and third signal processing circuits 210A,210B, 210C.

Figure 5:
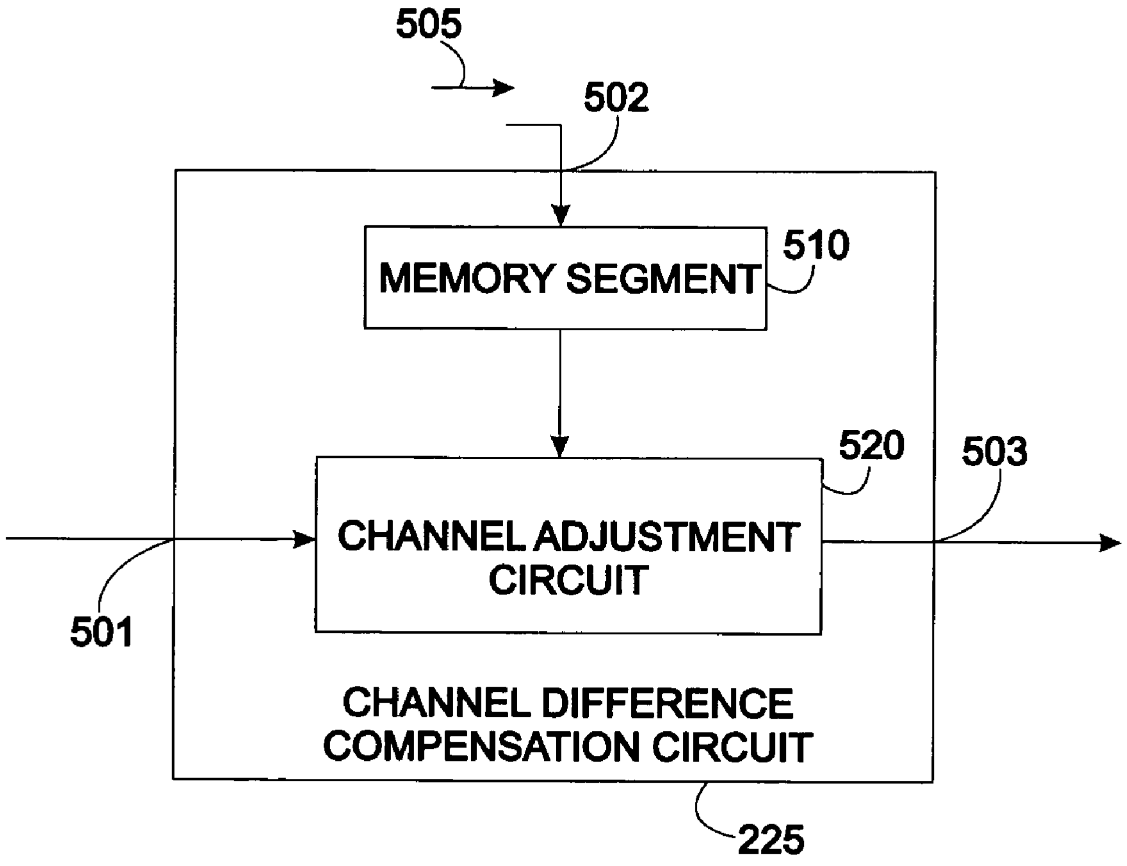
FIG. 5 is a drawing of a block diagram of one of the channel difference compensation circuits as described in various representative embodiments.

FIG. 5 is a drawing of a block diagram of one of the channel difference compensation circuits 225B,225C as described in various representative embodiments. The channel difference compensation circuit 225 comprises a channel difference memory segment 510 and a channel adjustment circuit 520.

In channel difference calibration mode x-w, second first-channel, second second-channel, and second third-channel switches $S_{2A}$,$S_{2B}$,$S_{2C}$, as well as third second-channel, and third third-channel switches $S_{3B}$,$S_{3C}$ are in the positions shown in FIG. 2. In such condition, the channel difference compensation circuit first input 501 (501B for second channel difference compensation circuit 225B and 501C for third channel difference compensation circuit 225C) is an open circuit. Also, the channel difference compensation circuit 225 at channel difference compensation circuit second input 502 (502B for second channel difference compensation circuit 225B and 502C for third channel difference compensation circuit 225C) receives a channel compensation value 505 which is the signal outputted from the channel difference computation circuit 215 at channel difference computation circuit output 402 (402B for second channel difference compensation circuit 225B and 402C for third channel difference compensation circuit 225C). In this mode, channel difference memory segment 510 stores the appropriate output of the channel difference compensation circuit 215.

In compensated operational mode, second first-channel, second second-channel, and second third-channel switches $S_{2A}$,$S_{2B}$,$S_{2C}$, as well as third second-channel, and third third-channel switches $S_{3B}$,$S_{3C}$ are in opposite positions to that shown in FIG. 2. In such condition, the channel difference compensation circuit first input 501 (501B for second channel difference compensation circuit 225B and 501C for third channel difference compensation circuit 225C) is attached to the output of the appropriate signal processing circuit 210 (210B for the second channel difference compensation circuit 225B and 210C for the third channel difference compensation circuit 225C) and receives the signal outputted from that signal processing circuit 210. Also, the channel difference compensation circuit second input 502 (502B for second channel difference compensation circuit 225B and 502C for third channel difference compensation circuit 225C) is an open circuit. And, the channel difference compensation circuit output 503 (503B for second channel difference compensation circuit 225B and 503C for third channel difference compensation circuit 225C) is connected to the channel output 221 (221B for second channel difference compensation circuit 225B and 221C for third channel difference compensation circuit 225C). In this mode, the channel adjustment circuit 520 uses the value stored in the channel difference memory segment 510 to appropriately adjust the image signal received from the appropriate signal processing circuit 210 for the differences in the various channels. As such, in this mode the first channel image signal 201A is appropriately processed by the first channel 220A without compensation for channel differences as compensation of the other channels is made with respect to the first channel 220A. Output of the processed first channel image signal 201A is placed at first channel output 221A as first channel output signal 222A. And in the second channel 220B, the second channel image signal 201B is appropriately compensated for channel differences relative to the first channel 220A. Output of the processed second channel image signal 201B is placed at second channel output 221B as second channel output signal 222B. Also in the third channel 220C, the third channel image signal 201C is appropriately compensated for channel differences relative to the first channel 220A. Output of the processed third channel image signal 201C is placed at third channel output 221C as third channel output signal 222C.

Figure 6:
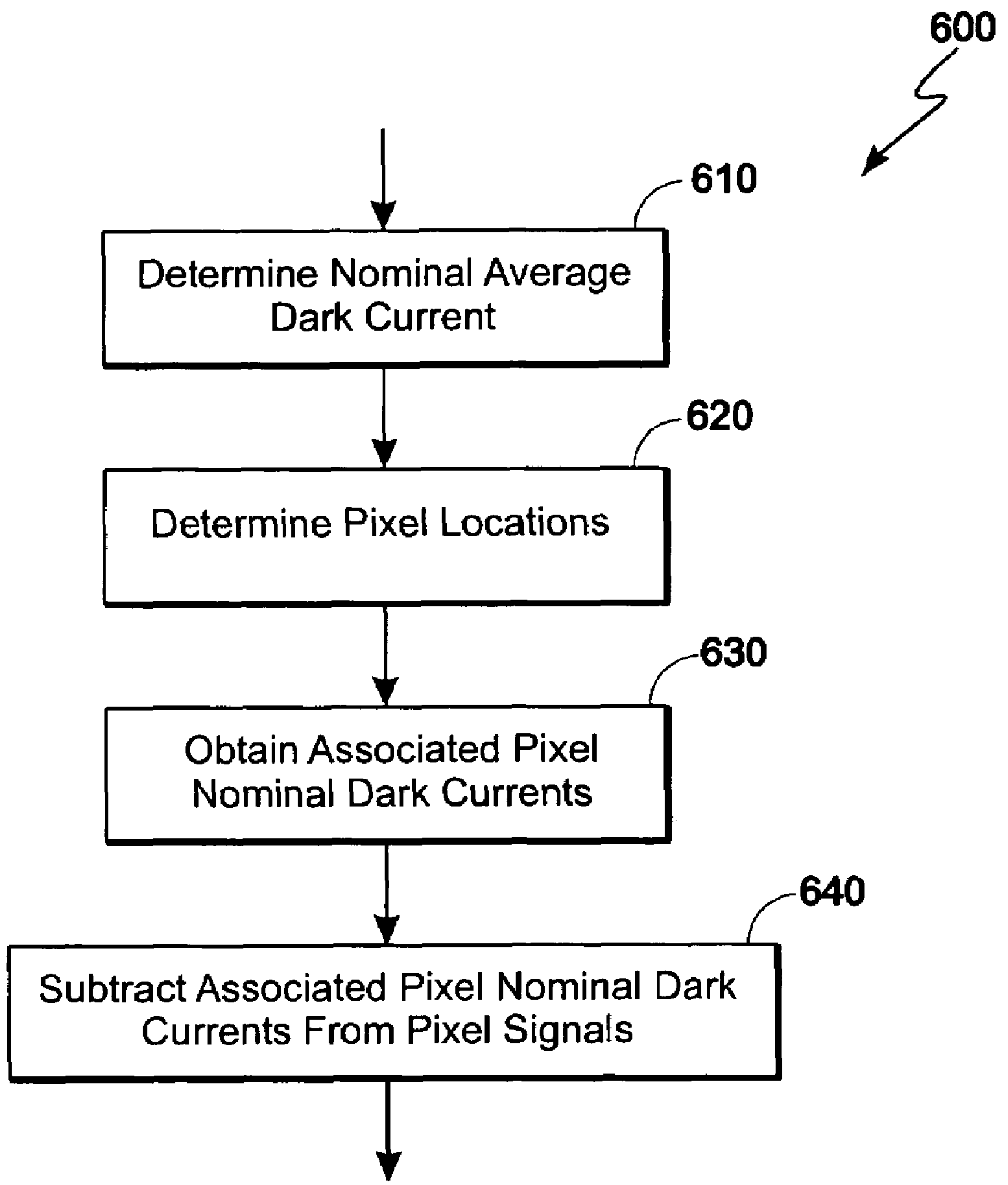
FIG. 6 is a drawing of a flow chart of a method for compensating the image sensor as described in various representative embodiments.

FIG. 6 is a drawing of a flow chart of a method 600 for compensating the image sensor 200 as described in various representative embodiments. In FIG. 6, the image sensor array 100 is compensated for dark current. In block 610, a nominal average dark current is determined for the image sensor array 100. As described above, the nominal average dark current can be determined by capturing the signal from the dark array 110 for a fixed period of time, i.e., a fixed number of clock cycles each of a fixed duration. For each pixel 130 in the first sub-array 110, a dark current signal 202 that is representative of charge collected in that pixel 130 in a given time period is detected. As previously indicated, the image sensor array 100 typically comprises the first sub-array 110 of pixels 130 and the second sub-array 120 of pixels 130; the pixels 130 in the first sub-array 110 are blocked from receiving light illumination 165; and the pixels 130 in the second sub-array 120 are capable of capturing an image 150. Then the values of the detected dark current signal 202 for all pixels 130 in the first sub-array 110 are averaged to obtain the nominal average dark current 202. Block 610 then transfers control to block 620.

In block 620, the relative location 140 of each pixel 130 in the image sensor array 100 is determined. Block 620 then transfers control to block 630.

In block 630, an associated nominal dark current 202 for with each pixel 130 based on the nominal average dark current 202 and on the relative location 140 of the pixel 130 is determined. At least two of the pixels 130 have differing associated nominal dark currents 202. Block 630 then transfers control to block 640.

In block 640, the associated nominal dark current 202 is subtracted from the image signal 201 for each pixel 130.

Figure 7A:
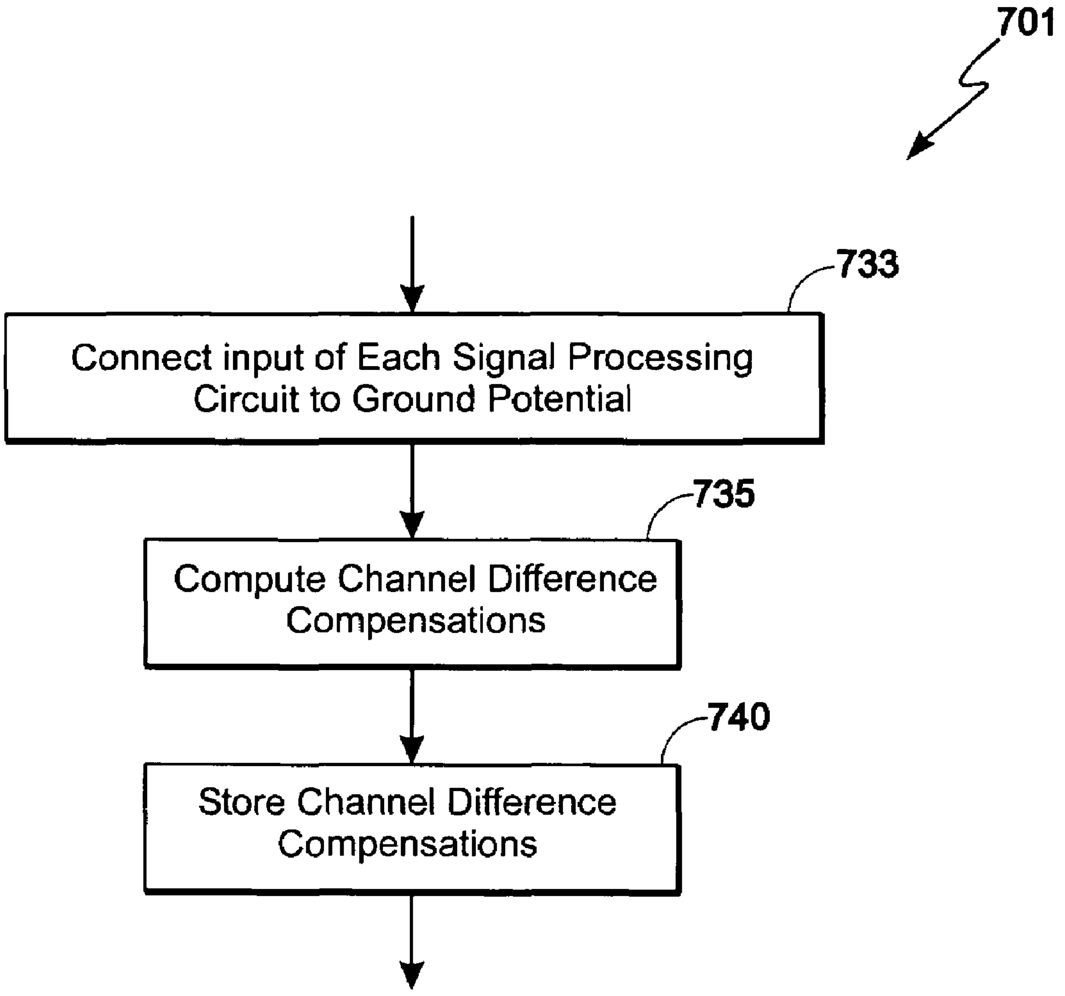
FIG. 7A is a drawing of a flow chart of another method for compensating the image sensor as described in various representative embodiments.

FIG. 7A is a drawing of a flow chart of another method 701 for compensating the image sensor 200 as described in various representative embodiments. In FIG. 7A, the image sensor circuit 200 is in the channel difference calibration mode x-w. The image sensor 200 comprises image sensor array 100 having multiple light sensitive pixels 130 and more than one signal detection/processing channels 220. The image sensor circuit 200 is in the channel difference calibration mode x-w when the first first-channel, first second-channel, and first third-channel switches $S_{1A}$,$S_{1B}$,$S_{1C}$, when the second first-channel, second second-channel, and second third-channel switches $S_{2A}$,$S_{2B}$,$S_{2C}$, and when the third second-channel and third third-channel switches $S_{3B}$,$S_{3C}$ are in the positions shown in FIG. 2.

In block 733, the inputs of the signal processing circuits 210 are connected to ground potential. Block 733 then transfers control to block 735.

In block 735, for each channel 220 other than a pre-selected reference channel 220 (220A in FIG. 2), a channel compensation value using the channel output (difference output signal 204B,204C) for that channel 220B,220C and the output signal (difference output signal 204A) for the reference channel 220 is computed. Block 735 then transfers control to block 740.

In block 740, the computed channel compensation value for each channel 220 is stored. Block 740 then switches to the method of FIG. 7B if the processes of obtaining values for the channel difference and dark current compensation have been obtained or to the method of FIG. 7C if an image 150 is to be captured.

Figure 7B:
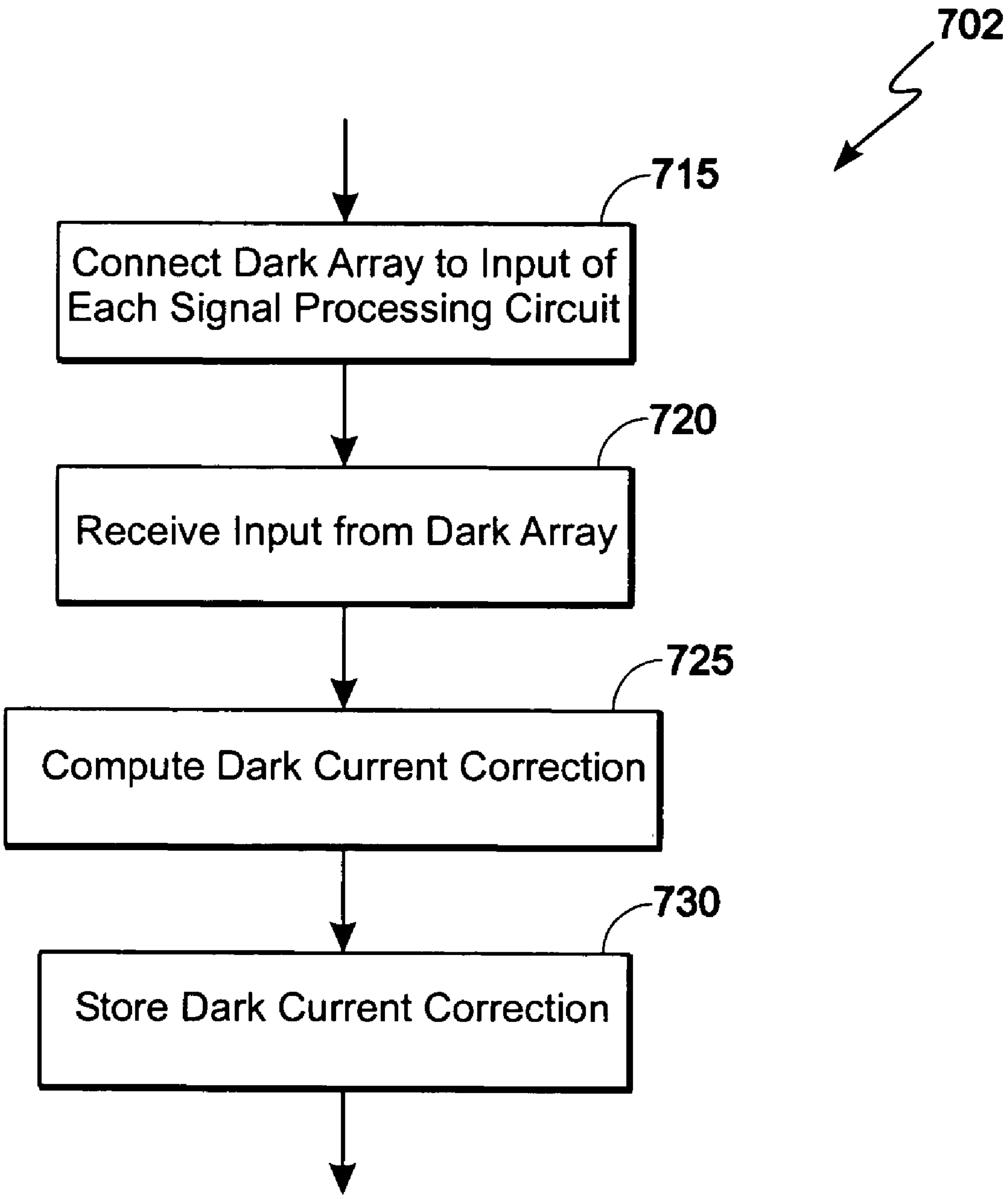
FIG. 7B is a drawing of a flow chart of still another method for compensating the image sensor as described in various representative embodiments.

FIG. 7B is a drawing of a flow chart of still another method 702 for compensating the image sensor as described in various representative embodiments. In FIG. 7B, the image sensor circuit 200 is compensated for dark current 202. The image sensor circuit 200 is in the dark current calibration mode y-w when the first first-channel, first second-channel, and first third-channel switches $S_{1A}$,$S_{1B}$,$S_{1C}$, when the second first-channel, second second-channel, and second third-channel switches $S_{2A}$,$S_{2B}$,$S_{2C}$, and when the third second-channel and third third-channel switches $S_{3B}$,$S_{3C}$ are in positions such that each second switch contact y is connected to the center contact w for its associated switch.

In block 715, the output of the dark array 110 is connected to the inputs of the signal processing circuits 210 (dark current calibration mode y-w occurs with switch positions as just described). Block 715 then transfers control to block 720.

In block 720, the dark current signal 202 from the dark array 110 is received at the input of each channel 220 for a pre-selected period of time which may be only a single pixel or two. The image sensor array 100 comprises the dark array 110 (the first sub-array 110) of pixels 130 and the image capture array 120 (the second sub-array 120) of pixels 130. The pixels 130 in the dark array 110 are blocked from receiving light illumination 165, and the pixels 130 in the image capture array 120 are capable of capturing an image 150. Block 720 then transfers control to block 725.

In block 725, the correction for the dark current is computed. This computation can be performed by transforming the input dark current signal 202 from the dark array 110 into an output signal (dark current compensation output signal 203A) for each of the channels 220, and then computing a dark current compensation value for each channel 220 using the output signal (dark current compensation output signal 203) for that channel 220. Block 725 then transfers control to block 730.

In block 730, the computed dark current compensation value(s) are stored. Block 735 then switches to the method of FIG. 7A if the processes of obtaining values for the channel difference and dark current compensation have been obtained or to the method of FIG. 7C if an image 150 is to be captured.

Figure 7C:
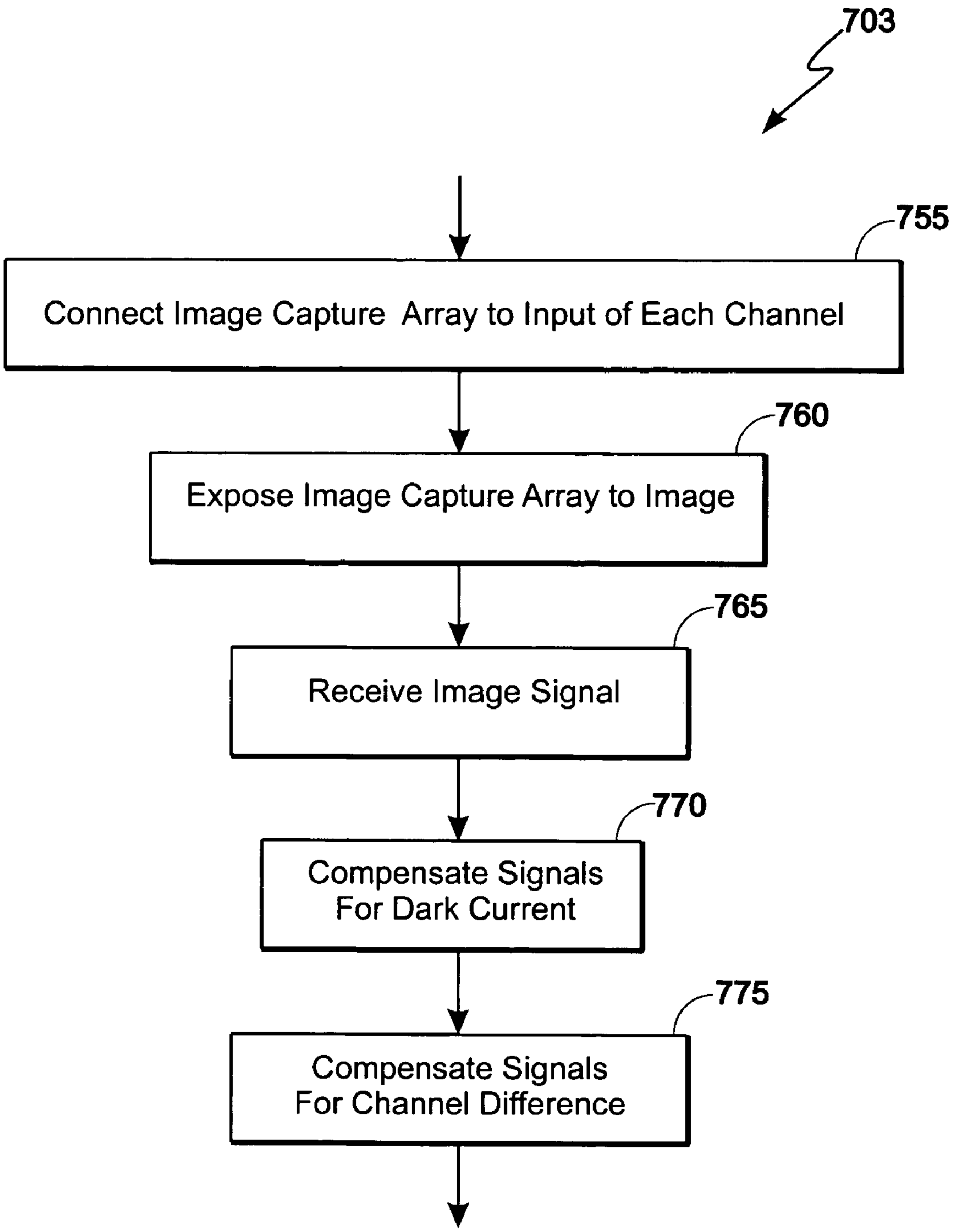
FIG. 7C is a drawing of a flow chart of yet another method for compensating the image sensor as described in various representative embodiments.

FIG. 7C is a drawing of a flow chart of yet another method 703 for compensating the image sensor as described in various representative embodiments. The image sensor circuit 200 is in the compensated operational mode z-w when the first first-channel, first second-channel, and first third-channel switches $S_{1A}$,$S_{1B}$,$S_{1C}$, when the second first-channel, second second-channel, and second third-channel switches $S_{2A}$, $S_{2B}$,$S_{2C}$, and when the third second-channel and third third-channel switches $S_{3B}$,$S_{3C}$ are in positions such that each third switch contact z is connected to the center contact w for its associated switch.

In block 755 of FIG. 7C, the outputs of the dark current compensation circuits 205 are connected to the inputs of the signal processing circuits 210. In addition, the inputs of the dark current compensation circuits 205 are also connected to the inputs of the dark current compensation circuits 205. The image sensor 200 is thus in the compensated operational mode z-w. Block 755 then transfers control to block 760.

In block 760, the image capture array 120 (the second sub-array 120) is exposed to the image 150. The image capture array 120 comprises channel sub-arrays 125, which is associated with each channel 220. Block 760 then transfers control to block 765.

In block 765, the image signal 201 from each channel sub-array 125 is received at input of its associated channel 220 (inputs to the dark current compensation circuits 205A, 205B,205C in FIG. 2). Block 765 then transfers control to block 770.

In block 770, the image signal 201 received from each channel sub-array 125 is compensated for dark current using the dark current compensation value for that channel 220. Block 770 then transfers control to block 775.

In block 775, the image signal 201 received from each channel sub-array 125 is compensated for each channel 220 for channel differences other than the pre-selected reference channel 220 using the channel compensation value for that channel 220. Block 775 then terminates the process with recalibration for channel processing differences and dark current being repeated as necessary via the method steps of FIGS. 7A and 7B.

As is the case, in many data-processing products, the systems described above may be implemented as a combination of hardware and software components. Moreover, the functionality required for use of the representative embodiments may be embodied in computer-readable media (such as floppy disks, conventional hard disks, DVDs, CD-ROMs, Flash ROMs, nonvolatile ROM, and RAM) to be used in programming circuits disclosed herein to perform in accordance with the techniques so described.

The term "program storage medium" is broadly defined herein to include any kind of computer memory such as, but not limited to, floppy disks, conventional hard disks, DVDs, CD-ROMs, Flash ROMs, nonvolatile ROM, and RAM.

Embodiments described herein provide the advantages of a more accurate compensation for dark current without excessive cost increases and faster, more accurate compensation for both dark current and channel differences.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method for compensating for dark current in an image sensor array having pixels arranged in rows and columns, wherein the image sensor array comprises more than two light sensitive pixels, comprising:

determining a nominal average dark current for the image sensor array;

determining a location of each pixel in the image sensor array in X and Y coordinates relative to a center of the image sensor array;

obtaining a respective nominal dark current associated with each pixel based on the nominal average dark current and on the location of the pixel in the X and Y coordinates, wherein at least two of the pixels on at least one of the rows of the image sensor have different nominal dark current values based on the respective x coordinates of the at least two pixels in the at least one row; and for each respective pixel, subtracting the obtained nominal dark current associated with the pixel from the image signal for the pixel.

2. The method of claim 1, wherein the method step determining the nominal average dark current comprises:

for each pixel in a first sub-array, detecting a dark current signal that is representative of charge collected in that pixel in a given time period, wherein the image sensor array comprises the first sub-array of pixels and a second sub-array of pixels, wherein pixels in the first sub-array are blocked from receiving light illumination, and wherein pixels in the second sub-array are capable of capturing an image; and averaging the values of the detected dark current signal for all pixels in the first sub-array to obtain the nominal average dark current.

3. The method as recited in claim 1, wherein the image sensor array comprises a first sub-array of pixels and a second sub-array of pixels and wherein the associated nominal dark current obtained for each pixel decreases with distance of the pixel from a maximum value at the edge of the second sub-array to a minimum value at center of the second sub-array.

4. The method as recited in claim 1, wherein the image sensor array comprises a first sub-array of pixels and a second sub-array of pixels and wherein the associated nominal dark current obtained for each pixel changes proportionally with distance of the pixel from a value at the edge of the second sub-array to a value at center of the second sub-array.

5. The method as recited in claim 1, wherein the image sensor array comprises a first sub-array of pixels and a second sub-array of pixels and wherein the associated nominal dark current obtained for each pixel decreases proportionally with distance of the pixel from a maximum value at the edge of the second sub-array to a minimum value at center of the second sub-array.

6. The method as recited in claim 2, wherein a relative location of the pixel in the second sub-array is assigned as the location of the pixel in the X and Y coordinates based on bands of pixels around the center of the second sub-array.

7. The method as recited in claim 1, wherein the determining a nominal average dark current comprises:

for each pixel, detecting a dark current signal that is representative of charge collected in that pixel in a given time period, wherein the pixels are blocked from receiving light illumination; and averaging the values of the detected dark current signal for all pixels to obtain the nominal average dark current.

8. A method for image signal compensation in an image sensor, wherein the image sensor comprises an image sensor array having multiple light sensitive pixels and more than one signal detection/processing channels, comprising:

for a pre-selected period of time, attaching input of each channel to ground potential, wherein the image sensor array comprises a first sub-array of pixels and a second sub-array of pixels, wherein pixels in the first sub-array are blocked from receiving light illumination, and wherein pixels in the second sub-array are capable of capturing an image; and receiving a difference output signal at the output of each channel;

for an additional pre-selected period of time, receiving a dark current signal from the first sub-array at input of each channel;

transforming the dark current signal into a dark current compensation output signal for each of the channels;

repeating the above steps at least once;

for each channel other than a pre-selected reference channel, computing a channel compensation value using the difference output signal for that channel and the difference output signal for the reference channel;

storing the computed channel compensation values;

computing a dark current compensation value for each channel using the dark current compensation output signal for that channel; and storing the computed dark current compensation values.

9. The method as recited in claim 8, wherein the pre-selected period of time and the additional pre-selected period of time are equal to the time necessary to receive a signal from two adjacent pixels.

10. The method as recited in claim 8, further comprising:

exposing the second sub-array to an image, wherein the second sub-array comprises a channel sub-array associated with each channel;

receiving an image signal from each channel sub-array at input of its associated channel;

compensating the image signal received from each channel sub-array for dark current using the dark current compensation value for that channel; and compensating the image signal received from each channel sub-array for each channel other than the pre-selected reference channel using the channel compensation value for that channel.

11. The method as recited in claim 8, wherein the method step computing the dark current compensation value for each channel comprises:

computing an average value of the dark current compensation output signal for that channel.

12. An image sensor circuit, comprising;

an image sensor array, wherein the image sensor array comprises a first sub-array of pixels and a second sub-array of pixels, the pixels in the second sub-array being arranged in rows and columns, wherein pixels in the first sub-array are blocked from receiving light illumination, and wherein pixels in the second sub-array are capable of capturing an image;

a dark current compensation circuit having an input connected to the second sub-array;

a signal processing circuit;

a first switch, wherein the first switch has capability of switching input to the signal processing circuit between the output of the first sub-array during a first time period and the output of the dark current compensation circuit during a second time period;

a second switch, wherein the second switch has capabilities of switching output of the signal processing circuit between input to the dark current compensation circuit during the first time period and output of the image sensor circuit during a second time period, wherein the dark current compensation circuit has capabilities of determining a nominal average dark current for the image sensor array from the output signal of the signal processing circuit during the first time period, determining the location of each pixel in the second sub-array in X and Y coordinates, obtaining a respective nominal dark current associated with each pixel in the second sub-array based on the nominal average dark current and on the location of the pixel in the X and Y coordinates, and for each respective pixel, subtracting the obtained nominal dark current associated with the pixel from the image signal for the pixel, and wherein at least two of the pixels on at least one of the rows of the second sub-array have different nominal dark current values based on the respective x coordinates of the at least two pixels in the at least one row.

13. The image sensor circuit as recited in claim 12, wherein the associated nominal dark current obtained for each pixel is dependent upon the distance of the pixel from the edge of the second sub-array.

14. The image sensor circuit as recited in claim 12, wherein the associated nominal dark current obtained for each pixel changes proportionally with distance of the pixel from the edge of the second sub-array to center of the second sub-array.

15. The image sensor as recited in claim 12, wherein the associated nominal dark current obtained for each pixel decreases with distance of the pixel from a maximum value at the edge of the image sensor array to a minimum value at center of the second sub-array.

16. The image sensor circuit as recited in claim 12, wherein a relative location of the pixel is assigned based on rectangular bands of pixels around the center of the second sub-array.

* * * * *